UNITED STATES PATENT OFFICE 2,520,179

4-THIAZOLIDONES AND A METHOD FOR PREPARATION THEREOF

Alexander R. Surrey, Albany County, N. Y., assignor to Sterling Drug Inc., New York, N. Y., a corporation of Delaware No Drawing. Application February 2, 1949, Serial No. 74,245

30 Claims. (Cl. 260—302)

This invention relates to 2-aryl-3-secondary-alkamino-4-thiazolidones, to 1-dioxides thereof, to addition salts of each type, and to processes of preparing the hereinbefore named compounds.

The compounds of my invention are those having the formula

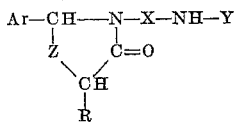

where Ar is an aryl group, X is a lower alkylene group, Y is alkyl, cycloalkyl, aralkyl, cycloalkylalkyl or hydroxyalkyl, Z is or $SO_2$, and R is hydrogen or a lower alkyl group. The aryl groups, designated hereinabove as Ar, are preferably those having 1-2 rings including substituted and unsubstituted phenyl, naphthyl and xenyl. Such aryl groups include unsubstituted aryl groups such as phenyl, 1-naphthyl, 2-naphthyl, and xenyl; alkoxyaryl groups such as 3-ethoxyphenyl, 3,4-dimethoxyphenyl, 3-ethoxy-4-methoxyphenyl, 3,-4-methylenedioxyphenyl, 3,4,5-trimethoxyphenyl, 4-n-butoxyphenyl, and the like; nitroaryl groups such as 3-nitrophenyl, 4-nitrophenyl, 4-nitro-1-naphthyl, 3,5-dinitrophenyl, and the like; carbalkoxyaryl groups such as 3-carbethoxyphenyl, 4-carbomethoxyphenyl, and the like; alkylaryl groups such as para-tolyl, 3-ethylphenyl, 4-methyl-1-naphthyl, and the like; aminoaryl group such as 4-aminophenyl, 4-acetylaminophenyl, 4-n-butylaminophenyl, 4-dimethylaminophenyl, and the like; haloaryl groups such as 4-chlorophenyl, 3,4-dichlorophenyl, 3,5-dibromophenyl, 4 - chloro-1-naphthyl, 3-bromo-1-naphthyl, and the like; carboxyaryl groups such as 4-carboxyphenyl, and the like; and related groups. The foregoing phenyl and substituted-phenyl groups, as well as equivalent groups thereto, can be designated as monocarbocyclic aryl groups. Lower alkylene groups, designated hereinabove as X, preferably have 2-8 carbon atoms and include the following: —CH₂CH₂—

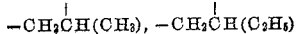
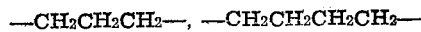
—CH₂CH(OH)CH₂—
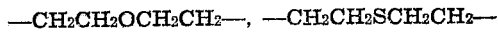
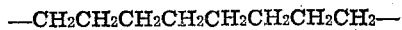

and the like. Groups designated hereinabove as Y are preferably radicals of 1–8 carbon atoms selected from the group consisting of alkyl, cycloalkyl, aralkyl, cycloalkylalkyl and hydroxyalkyl; such groups include the following: methyl, ethyl, n-butyl, isobutyl, n-amyl, n-hexyl, 3-hexyl, n-octyl, 2-octyl, 2-hydroxyethyl, 5-hydroxypentyl, 3-hydroxybutyl, cyclohexyl, cyclopentyl, cyclopropyl, benzyl, 2-phenylethyl, 2-(4-methoxyphenyl)ethyl, 3-(4 - n-butylaminophenyl)propyl, cyclohexylmethyl, 3-cyclopentylpropyl, 2-cyclopropylethyl, and the like. The group R where lower alkyl preferably has 1–6 carbon atoms. The 3-substituent, embodying both the groups X and Y in the hereinabove shown manner,

—X—NH—Y can be designated as a secondary alkamino group. The following compounds are illustrative of my invention:

(1) 2-(3,4-diethoxyphenyl-3-(4-ethylaminobutyl)-4-thiazolidone

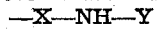

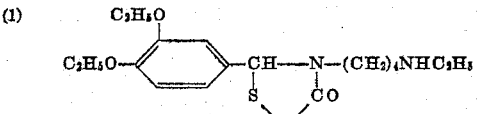

(2) 2-(4-ethylphenyl)-3-(2-n-octylaminoethyl)-4-thiazolidone

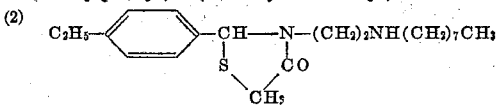

(3) 2-(4-n-butylaminophenyl)-3-(3-n-butylamino-2-propyl)-5-methyl-4-thiazolidone-1-dioxide

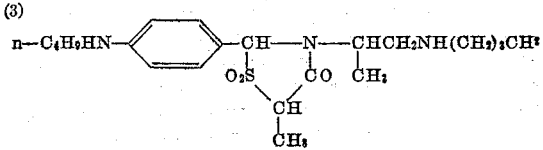

(4) 2-(4-n-butoxyphenyl)-3-(2-(4-methoxybenzylamino)ethyl)-5-n-propyl-4-thiazolidone

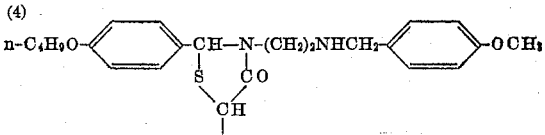

(5) 2-(3,4-methylenedioxyphenyl)-3-(3-(3-hydroxypropylamino)propyl)-4-thiazolidone

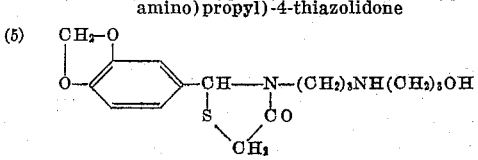

2-(3-nitrophenyl)-3-(3-cyclohexylaminopropyl)-5-ethyl-4-thiazolidone (6) 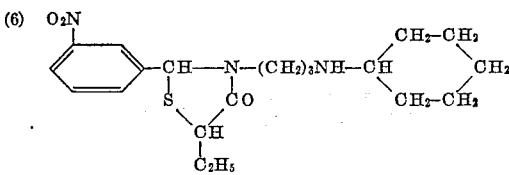

2-(2-naphthyl)-3-(2-cyclopentylmethylaminoethyl)-4-thiazolidone (7) 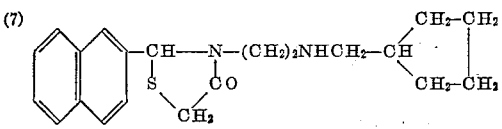

2-(3,4-dibromophenyl)-3-(5-cyclopropylaminopentyl)-4-thiazolidone-1-dioxide (8) 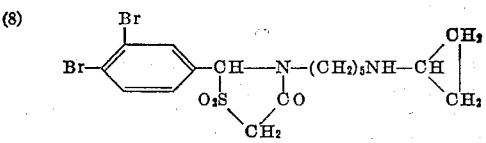

2-(4-amino-1-naphthy)-3-(3-isoamylaminopropyl)-4-thiazolidone (9) 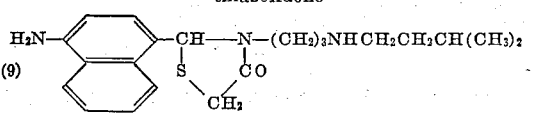

The compounds of my invention where Z is S are prepared by reacting an anil of the formula, ArCH=N-X-NH-Y, where Ar, X and Y have the same meanings designated hereinabove, with a lower alkyl 2-mercaptoalkanoate. The procedure I prefer in practicing my invention is to carry out the reaction using preferably methyl thioglycolate as the lower alkyl 2-mercaptoalkanoate in a refluxing petroleum ether fraction having a boiling range of about 100–140° C. with a continuous separator connected to the apparatus. (See illustrations on p. 262 and p. 422, Organic Synthesis, Collective Volume I, 2nd ed., New York, 1941.) The methanol which forms during the reaction is collected as a distinct layer in the separator. Heating is discontinued when no further separation of methanol is noted. In most instances the amount of methanol collected approaches the theoretical quantity necessary for completion of the reaction. When a lower boiling fraction of petroleum ether is used as the solvent, the reaction proceeds in the same manner, however separation of methanol cannot be observed due to the miscibility of the alcohol with the hydrocarbon. Alternatively, the reaction can be run in the absence of a solvent or in the presence of other inert solvents such as benzene, toluene, and the like. In a typical example of the above general procedure, using as the anil, N-(4-n-butoxybenzylidene) - 4 - cyclopentylaminobutylamine (prepared from 4-n-butoxybenzaldehyde and 4-cyclopentylaminobutylamine), the resulting product is 2-(4-n-butoxyphenyl) -3-(4-cyclopentylaminobutyl) -4-thiazolidone of the formula

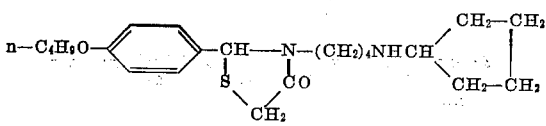

In the above general procedure other lower alkyl 2-mercaptoalkanoates can be substituted for methyl thioglycolate. Thus, 2-(4-nitrophenyl)-3-(2-isoamylaminoethyl) - 4 - thiazolidone is formed when ethyl thioglycolate or butyl thioglycolate is allowed to react with N-(4-nitrobenzylidene-2-isoamylaminoethylamine. Similarly, 2-(4-chlorophenyl) - 3 - (3 - benzylaminopropyl)-5-n-propyl-4-thiazolidone and 2-(4-n-butylaminophenyl)-3-(2 - (2 - cyclohexylethylamino) ethyl)-5-methyl-4-thiazolidone are formed when the reactants are, respectively, N-(4-chlorobenzylidene)-3 - benzylaminopropylamine and methyl 2-mercaptopentanoate, and N-(4-n-butylaminobenzylidene)-2-(2 - cyclohexylethylamino) ethylamine and ethyl 2-mercaptopropanoate.

The 2-aryl-3-secondary-alkamino-4-thiazolidones of my invention where the aryl group is substituted by an amino radical are readily prepared by reducing the corresponding nitroaryl compounds. For example, 2-(4-aminophenyl) - 3-(3-cyclohexylaminopropyl) - 4 - thiazolidone is formed by reducing 2-(4-nitrophenyl)-3-(3-cyclohexylaminopropyl)-4-thiazolidone in an ethanol-water solution with iron filings in the presence of a small quantity of acetic acid.

The compounds of my invention where Z is $SO_2$ are conveniently prepared by oxidizing the corresponding thiazolidone (where Z is S). For example, 2-(3,4-methylenedioxyphenyl)-3-(2-(2-(4 - methoxyphenyl) ethylamino) ethyl) -4-thiazolidone-1-dioxide is formed by oxidation of 2-3,4-methylenedioxyphenyl)-3-(2-(2-(4-methoxyphenyl) ethylamino) ethyl) -4-thiazolidone. Useful oxidizing agents in this reaction include potassium permanganate, hydrogen peroxide, chromium trioxide ($CrO_3$), and the like.

The intermediate anils of the formula, $$ArCH=N-\bar{X}-NH-Y$$

as shown above, are readily prepared by refluxing in an inert solvent such as benzene or a petroleum ether fraction having a boiling range of 100–140° C. equimolecular quantities of the appropriate aryl aldehyde, ArCHO, and a diamine of the formula, $Y-NH-X-NH_2$, with a continuous separator connected to the apparatus. When the reaction is complete, either the solvent is removed and the remaining reaction mixture distilled under reduced pressure to isolate the anil, or a lower alkyl 2-mercaptoalkanoate is added and refluxing continued to produce a 4-thiazolidone of my invention. In practicing my invention I found it convenient, in most preparations, to follow the latter course of not isolating the intermeidate anil. Alternatively, the intermediate anils can be prepared in the absence of a solvent by warming a mixture of the reactants on a steam bath from one to six hours.

The intermediate diamines of the foregoing-designated formula, $Y-NH-X-NH_2$, are generally known in the art, as are methods of preparing them. The preparation and properties of new compounds of this type are given below with the examples.

In practicing my invention I found it convenient in most preparations to isolate and use the basic compounds of my invention as the water-soluble hydrochloric acid addition salts. It is, of course, understood that other water-soluble salts will serve the same purpose and are within the scope of my invention. Such salts include the following derived from the appropriate non-toxic inorganic acids: the hydrobromide, sulfate, phosphate, sulfamate, and the like; and the following derived from the appropriate non-toxic organic acids: the tartrate, citrate, succinate, acetate, ethanesulfonate, benzoate, oleate, and the like.

Also within the scope of my invention are the quaternary salts of my basic compounds derived from the union of the basic compounds with esters of non-toxic, strong inorganic acids, or organic sulfonic acids, e. g. methyl iodide, ethyl bromide, n-propyl bromide, benzyl chloride, ethyl sulfate, methyl para-toluenesulfonate, and the like, to give, respectively, the methiodide, ethobromide, n-propobromide, benzochloride, ethosulfate, metho-para-toluenesulfonate, and the like.

The following examples will further illustrate specific embodiments of the invention.

EXAMPLES

I. *Intermediate Diamines of the formula* Y-NH-X-NH2

As pointed out above, most of these intermediate diamines used in practicing my invention are generally old, as are methods of preparing them. New compounds of this type and their preparation are given as follows.

Diamines of the formula Y-NH-(CH2)3NH2 were conveniently prepared by the following procedure (Tarbell et al., J. A. C. S. 68, 1217 (1946)) as illustrated in the preparation of the 3-isobutylaminopropylamine: Acrylonitrile (24.2 g.) was added dropwise with stirring over a period of ninety minutes to 50 g. of isobutylamine cooled in a water bath, the temperature of which was never greater than 30° C. The resulting mixture, after standing for five hours at room temperature, was heated for ninety minutes on a steam bath, allowed to stand overnight at room temperature and fractionated. The desired fraction of 3-isobutylaminopropanenitrile distilled at 105-107° C. and 15-17 mm. Related new alkaminopropanenitriles of the formula,

Y—NH(CH2)2CN prepared according to the foregoing procedure are given in the following Table I:

TABLE I

| Y | Percent Yield | B. P./° C. at mm. | $n_D^{25}$ |
|---|---|---|---|
| n-Pentyl | 88 | 70-73, 0.7 | 1.4395 |
| n-Hexyl | 91 | 130-134, 12 | 1.4410 |
| n-Octyl | 91 | 117-120, 1 | 1.4452 |
| Benzyl | 92 | 119-124, 0.7-0.8 | 1.5296 |

The above-described 3 - isobutylaminopropanenitrile was hydrogenated while dissolved in approximately four volumes of ethanolic-ammonia solution (12.5%) in the presence of Raney nickel at 120° C. with 1500-2000 lbs. pressure of hydrogen. After removing the catalyst and solvent, the product, 3-isobutylaminopropylamine, B. P. 80-83° C. at 19 mm., was obtained by distillation of the remaining reaction mixture using a short packed column. In this same manner were obtained the following diamines of the formula Y-NH-(CH2)3NH2 was given in Table II:

TABLE II

| Y | Per Cent Yield | P. P. at mm. | $n_D^{25}$ |
|---|---|---|---|
| n-Pentyl | 70 | 106-109, 18 | 1.4470 |
| n-Hexyl | 70 | 110, 9 | 1.4481 |
| n-Octyl | 70 | 143-146, 12 | 1.4512 |
| Benzyl | 77 | 98-102, 1 | 1.5321 |
| 2-Cyclohexylethyl | 95 | 145-146, 10 | 1.4790 |

6-cyclohexylamino - n - hexylamine was prepared according to the procedure described by Pearson et al. in J. A. C. S. 68, 1225 (1946) for the preparation of the related 2-cyclohexylaminoethylamine. Cyclohexanone (17.7 g.) was mixed with 42 g. of 1,6-hexamethylenediamine, the mixture allowed to stand for one hour and then reduced, after adding 0.35 g. of pre-reduced platinum oxide in 25 ml. of ethanol, at 3.5 atmospheres of hydrogen. The theoretical drop in pressure took about two and one-half hours. The catalyst was filtered off, and the product, 6-cyclohexylamino-n-hexylamine, B. P. 115-118° C. at 0.7 to 0.8 mm. and $n_D^{25}$ 1.4756, was obtained by distillation.

II. *2 - aryl-3-(sec-alkamino) - 4 - thiazolidones*

The preparation of these basic 4-thiazolidones having the above-given general formula

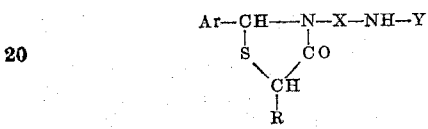

is exemplified by the following specific illustrations.

A. *2 - (3,4 - methylenedioxyphenyl)-3-(3 - isobutylaminopropyl) - 4 - thiazolidone hydrochloride.*—A mixture of 140 g. of 3-isobutylaminopropylamine, 161.5 g. of 3,4-methylenedioxybenzaldehyde and 600 cc. of a petroleum ether fraction of boiling range 100-140° C. was refluxed with stirring for 2.5 hours. At the end of this time practically the theoretical amount of water (19.3 cc.) was collected in a continuous separator connected to the apparatus. Methyl thioglycolate (116 g.) was added to the reaction mixture and refluxing continued until approximately the theoretical amount of methanol (40 cc.) was collected in the separator. After allowing the reaction mixture to cool, 280 ml. of 3.86 N ethanolic-hydrogen chloride solution was added and the solid hydrochloride salt which formed was filtered after adding some isopropanol to the mixture. After drying at 95° C. for 24 hours the yield was 195 g. This salt, 2-(3,4-methylenedioxyphenyl) - 3 - (3 - isobutylaminopropyl)-4-thiazolidone hydrochloride, melted at 149.9-150.3° C. (corr.) after recrystallization from isopropanol.

A sample of the hydrochloride was dissolved in water and the base liberated with dilute sodium hydroxide solution and extracted with ether. Removal of the ether gave a residue which solidified on standing. After recrystallization from n-hexane, this base, 2 - (3,4 - methylenedioxyphenyl)-3-(3 - isobutylaminopropyl)-4-thiazolidone, melted at 81.3-82.4° C. (corr.).

B. *2-(3,4-methylenedioxyphenyl)-3-(2 - cyclohexylaminoethyl)-4-thiazolidone.*—A mixture of 200 g. of 2-cyclohexylaminoethylamine, 211 g. of 3,4-methylenedioxybenzaldehyde and 1 liter of petroleum ether of boiling range 100-140° C. was refluxed with stirring with a continuous separator connected to the apparatus. After about one hour 21 ml. of water was collected. Methyl thioglycolate (150 g.) was added and refluxing continued until no more methanol separated in the separator (approximately 51 ml. of methanol collected). The reaction mixture was allowed to cool, some benzene added, the resulting solution chilled in an ice bath and the side of the container scratched to start crystallization. The solid which separated was collected with the aid of a large volume of n-heptane. This solid was heated with stirring in a large volume of warm n-pentane and filtered; yield 412 g. of 2-(3,4-methylenedioxyphenyl) - 3 - (2 - cyclohexylaminoethyl)-4-thiazolidone, M. P. 98–100° C. A sample recrystallized from ether melted at 98–100° C.

The following salts of the foregoing described secondary-alkamino thiazolidone were prepared:

*Hydrochloride.*—412 g. of 2-(3,4-methylenedioxyphenyl)-3-(2-cyclohexylaminoethyl)-4 - thiazolidone, was dissolved in 2 liters of acetone, the solution filtered with charcoal, and to the filtrate was added 280 ml. of 4.24 N ethanolic-hydrogen chloride solution. The hydrochloride salt which crystallized slowly was collected, washed with acetone, stirred in hot acetone, refiltered and washed with ether. After drying at 95° C. for 72 hours the product, 2-(3,4-methylenedioxyphenyl)-3-(2-cyclohexylaminoethyl)-4-thiazolidone hydrochloride (416 g.), melted at 186.3–187° C. (corr.).

*Phosphate.*—A solution of 3.5 g. of 2-(3,4-methylenedioxyphenyl)-3-(2 - cyclohexylaminoethyl)-4-thiazolidone in methanol was treated with the calculated amount of phosphoric acid dissolved in methanol. Some ether was added and the solution allowed to stand at room temperature. The salt which separated was recrystallized from methanol-ether, yielding 2-(3,4-methylenedioxyphenyl)-3-(2 - cyclohexylaminoethyl)-4-thiazolidone phosphate, M. P. 203.2–204.1° C. (corr.).

*2-hydroxy-3-naphthoate.*—A solution of 1.8 g. of 2-hydroxy-3-naphthoic acid in 10 ml. of hot methanol was added to a warm solution of 3.5 g. of 2-(3,4-methylenedioxyphenyl)-3-(2-cyclohexylaminoethyl)-4-thiazolidone in 15 ml. of methanol. The resulting solution was warmed on the steam bath and filtered with charcoal. Isopropanol was added to the filtrate and on standing there separated about 3.5 g. of 2-(3,4-methylenedioxyphenyl)-3-(2 - cyclohexylaminoethyl)-4-thiazolidone 2-hydroxy-3-naphthoate, M. P. 179–180° C.

C. *2-phenyl-3-(3-n-butylaminopropyl)-4-thiazolidone hydrochloride.*—This preparation was carried out by first isolating the intermediate anil, N-(benzylidene)-3-(n-butylamino)propylamine. A mixture of 42.4 g. of benzaldehyde, 62 g. of 3-n-butylaminopropylamine and 160 ml. of dry benzene was refluxed for five hours while removing the water as it formed. The product, N-benzylidene-3-n-butylaminopropylamine, was vacuum distilled, 67 g. boiling at 113–117° C. at 0.4–0.5 mm.

The above N-benzylidene-3-n-butylaminopropylamine (43.6 g.) and 21.2 g. of methyl thioglycolate in 200 ml. of petroleum ether of boiling range 100–140° C. were refluxed for about 8 hours (8 ml. of methanol collected). The solvent was removed in vacuo and the residue was taken up in ether and extracted with 1 N hydrochloric acid solution. The combined acid extracts were made alkaline with dilute sodium hydroxide solution and the liberated base was taken up with ether. After the ether extract was dried, the ether was removed by distillation and the residue dissolved in 5–10 volumes of acetone and the calculated amount of ethanolic-hydrogen chloride added. The hydrochloride salt which separated was collected (28.5 g.) and recrystallized from isopropanol. This product, 2-phenyl-3-(n-butylaminopropyl) - 4 - thiazolidone hydrochloride, melted at 168–170° C. (corr.).

D. *2-phenyl-3-(3-n-butylaminopropyl)-5-ethyl-4-thiazolidone hydrochloride.*—A mixture of 13.4 g. of methyl 2-mercaptobutanoate. (This ester was prepared by refluxing 24 g. of the corresponding acid with 5 ml. of concentrated $H_2SO_4$ and 96 ml. of methanol for 16 hours, thereafter pouring the reaction mixture into ice water, extracting the product with ether, and then washing the ether extract with water, 10% sodium bicarbonate solution and water. After drying the ether extract and removing the ether, there remained 19 g. of methyl 2-mercaptobutanoate.), 21.8 g. of N-benzylidene-3-n-butylaminopropylamine and 125 ml. of petroleum ether of boiling range 100–140° C. was refluxed for about 8 hours, after which time approximately the theoretical amount of methanol was collected. After removal of the solvent by distillation the residue was dissolved in ether and extracted with 1 N hydrochloric acid. The combined acidic extracts were made alkaline with aqueous sodium hydroxide solution and the mixture extracted with ether. Removal of the ether by distillation gave 26 g. of oil which was dissolved in 10 volumes of acetone. To this solution was added ethanolic-hydrogen chloride followed by a large volume of absolute ether. On standing, 12 g. (34%) of solid separated, M. P. 119–122° C. Two recrystallizations from ethyl acetate and drying at 95° C. for 2 hours, raised the melting point to 125.2–126.5° C. (corr.). This solid is 2-phenyl-3-(3-n-butylaminopropyl)-5-ethyl - 4 - thiazolidone hydrochloride.

E. *2-(4-nitrophenyl) 3-(3 - n - butylaminopropyl)-4-thiazolidone hydrochloride.*—A mixture of 15 g. of 4-nitrobenzaldehyde and 13 g. of 3-n-butylaminopropylamine in 100 ml. of dry benzene was refluxed for 90 minutes (the theoretical amount of water being collected in a continuous separated connected to the apparatus). Eleven grams of methyl thioglycolate was added and refluxing continued for 3½ hours. The reaction mixture was then allowed to stand overnight at room temperature. Additional benzene was added to the reaction mixture (some tarry material had separated) and the benzene solution was extracted with 1 N hydrochloric acid. The solid hydrochloride, which separated from the combined acid extracts, was recrystallized from isopropanol and triturated with acetone; yield 14 g. of 2-(4-nitrophenyl)-3-(3-n-butylaminopropyl)-4-thiazolidone hydrochloride, M. P. 205–205.6° C. (corr.).

F. *2-(4-aminophenyl)-3-(3-n-butylaminopropyl)-4-thiazolidone hydrochloride.*—A mixture of 2-(4-nitrophenyl)-3-(3-n-butylaminopropyl)-4-thiazolidone (prepared from 7.0 g. of the corresponding hydrochloride by dissolving the latter in water, basifying with sodium hydroxide, extracting with benzene, and removing the benzene by distillation), 28 g. of iron filings, 50 ml. of ethanol, 25 ml. of water and 1 ml. of glacial acetic acid was refluxed with stirring for three hours. The solution was made alkaline with $Na_2CO_3$, more ethanol added and the resulting solution filtered hot. The ethanol was distilled and the amino compound was extracted with chloroform. The product, after removal of the chloroform, was dissolved in 5 volumes of acetone and ethanolic-hydrogen chloride added. The resulting hydrochloride (5 g.), M. P. 185–186° C., was recrystallized from ethanol, M. P. 192.6–193.2° C. (corr.). This compound is 2-(4-aminophenyl)-3-(3-n-butylaminopropyl)-4 - thiazolidone hydrochloride.

G. 2 - (3,4 - methylenedioxyphenyl) - 3 - (3 - (2 - cyclohexylethylamino)propyl) - 4 - thiazol-

*idone hydrochloride.*—A mixture of 15 g. of 3-(2-cyclohexylethylamino)propylamine and 12 g. of 3,4-methylenedioxybenzaldehyde in 100 ml. of a petroleum ether fraction comprising mixed octane (B. P. range of 100–140° C.) was refluxed in a flask adapted with a continuous separator for two hours, at the end of which time the theoretical amount of water was collected. Methyl thioglycolate (8.7 g. was added and refluxing continued for two hours longer with continuous removal of the methanol formed. After removal of the petroleum ether solvent, the remaining residue was dissolved in ether, the ether solution filtered and extracted with 1 N hydrochloric acid. The solid hydrochloride which separated was collected and recrystallized several times from isopropanol, thereby yielding the desired product, 2 - (3,4 - methylenedioxyphenyl) - 3 - (3 - (2 - cyclohexylethylamino)propyl) - 4 - thiazolidone hydrochloride, M. P. 139.2–142° C. (corr.).

H. *2 - (3,4 - methylenedioxyphenyl) - 3 - (6 - cyclohexylamino - n - hexyl) - 4 - thiazolidone and hydrochloride thereof.*—A mixture of 18.5 g. of 6-cyclohexylamino-n-hexylamine and 14 g. of 3,4-methylenedioxybenzaldehyde in 100 ml. of a petroleum fraction comprising mixed octanes (B. P. range of 100–140° C.) was refluxed in a flask adapted with a continuous separator until separation of water was complete. Methyl thioglycolate (10 g.) was added and refluxing continued until no more methanol was collected in the continuous separator. After cooling, the reaction solvent was decanted from the separated oil which was dissolved in ether. The ether solution was extracted with 1 N hydrochloric acid, the extracts basified with dilute sodium hydroxide solution, and the alkaline mixture extracted with ether. After removal of the ether, the residue (24 g.) was dissolved in acetone, filtered with charcoal and to the filtrate was added ethanolic-hydrogen chloride. The solid which separated (1 g.) melted at 223–226° C. and did not depress the M. P. of a sample of the dihydrochloride prepared from 6-cyclohexylamino-n-hexylamine.

Ether was added to the acetone filtrate and about 9 g. of a crystalline solid separated on standing. It was recrystallized from isopropanol (M. P. 122–124° C.), dissolved in hot water and the solution basified with dilute sodium hydroxide solution. The solid base which separated was collected, washed with water and recrystallized from ethanol-ether, yielding 2-(3,4-methylenedioxyphenyl) - 3 - (6 - cyclohexylamino - n - hexyl) - 4 - thiazolidone, M. P. 98.4–100.2° C. (corr.).

The filtrated from the foregoing recrystallization was treated with ethanolic-hydrogen chloride to give 2-(3,4-methylenedioxyphenyl)-3-(6-cyclohexylamino - n - hexyl) - 4 - thiazolidone hydrochloride, M. P. 127.9–129.8° C. (corr.).

I. *2 - (4 - n - butoxyphenyl) - 3 - (3 - n - propylaminopropyl) - 4 - thiazolidone hydrochloride monohydrate.*—A mixture of 26.7 g. of 4-n-butoxybenzaldehyde and 17.4 g. of 3-(n-propylamino)propylamine in 100 ml. of dry benzene was refluxed until no more water separated in a continuous separator connected to the reaction flask. The benzene was removed by distillation in vacuo and to the residue was added 100 cc. of mixed octanes (boiling range of 100–140° C.) and 16 g. of methyl thioglycolate. The mixture was refluxed gently until no more methanol was collected in the continuous separator. After cooling the mixture was extracted with 1 N hydrochloric acid, the combined acid extracts were made alkaline and extracted with ether. After removing the ether, the residual oil (41.3 g.) was dissolved in about 5 volumes of acetone, filtered with charcoal and treated with ethanolic-hydrogen chloride and ether. The solid which separated was collected and washed with ether, yield 42.5 g. (81%). This solid was recrystallized first from acetone, then twice from acetone-ether to yield the desired product, 2 - (4 - n - butoxyphenyl) - 3 - (3 - n - propylaminopropyl) - 4 - thiazolidone hydrochloride monohydrate, M. P. 84.2–85.4° C. (corr.).

Additional compounds where the 2-aryl substituent of my 4-thiazolidones is phenyl or substituted-phenyl that were prepared according to directions given in the foregoing examples include those having the formula

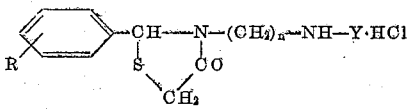

where R, n, and Y have the meanings given in Table III. Isopropanol was used as the recrystallizing solvent except where otherwise indicated.

TABLE III

| R | n | Y | Per Cent Yield | M. P./°C. (corr.) |
|---|---|---|---|---|
| 3,4—$O_2CH_2$[a] | 2 | $(CH_2)_2OH$ | 16 | [c] 152.2–155.4 |
| 3,4—$O_2CH_2$[a] | 3 | do | 57 | 140.1–141.3 |
| 3,4—$O_2CH_2$[a] | 3 | n-$C_3H_7$ | 80 | 173.3–174.5 |
| 3,4—$O_2CH_2$[a] | 3 | i-$C_3H_7$ | 57 | 169.3–171.4 |
| 3,4—$O_2CH_2$[a] | 3 | n-$C_4H_9$ | 49 | 189.4–190.8 |
| 4—$OC_2H_5$—3—$OCH_3$ | 3 | do | 54 | 96–99 |
| 3,4—$O_2CH_2$[a] | 3 | n-$C_5H_{11}$ | 90 | 179.8–181.1 |
| 4—Cl | 3 | do | 57 | 135.6–137 |
| 3,4—$O_2CH_2$[a] | 3 | n-$C_6H_{13}$ | 60 | 172.7–173.0 |
| 3,4—$O_2CH_2$[a] | 3 | n-$C_8H_{17}$ | 42 | 132.3–134.0 |
| 3,4—$O_2CH_2$[a] | 3 | $C_6H_{11}$[b] | 95 | 146–148 |
| 4—$OCH_3$ | 3 | do | 22 | 152–153.8 |
| 3,4—$O_2CH_2$[a] | 3 | $CH_2C_6H_5$ | 10 | 176.7–178.2 |

[a] 3,4—methylenedioxy.
[b] Cyclohexyl.
[c] Recrystallizing solvent was methanol-ethanol.

Other 2 - aryl - 3 - (secondary - alkamino) - 4 - thiazolidones that are prepared according to directions given in the foregoing examples using the appropriate reactants include the following:

2 - (4 - n - butoxyphenyl) - 3 - (3 - cyclohexyl-methylamino - 2 - propyl) - 4 - thiazolidone;

2 - (4 - n - butylaminophenyl) - 3 - (3 - (2 - phenylethylamino)propyl) - 4 - thiazolidone;

2 - (3,4 - methylenedioxyphenyl) - 3 - (3 - iso-amylaminopropyl) - 5 - methyl - 4 - thiazolidone;

2 - (4 - methyl - 1 - naphthyl) - 3 - (3 - cyclo-pentylaminopropyl) - 4 - thiazolidone; and the like.

III. *2 - aryl - 3 - (secondary - alkamino) - 4 - thiazolidone - 1 - dioxides*

These basic 4 - thiazolidone - 1 - dioxides were prepared by oxidizing the corresponding 2-aryl-3-(secondary-alkamino)-4-thiazolidones the preparation of which is described in section II hereinabove. In the following specific embodiments of my invention the oxidizing agent used is potassium permanganate, however other oxidizing agents such as hydrogen peroxide or chromium trioxide ($CrO_3$) can be used.

A. *2 - (4 - chlorophenyl) - 3 - (3 -n - pentyl-aminopropyl) - 4 - thiazolidone - 1 - dioxide hydrochloride.*—To a solution of 8.5 g. of 2-(4-chlorophenyl) - 3 - (3 - n - pentylaminopropyl) - 4-thiazolidone in 30 ml. glacial acetic acid at 5–10° C. was added dropwise a solution of 8.6 g. of potassium permanganate in 300 ml. of water over a period of 30 minutes. Sodium bisulfite solution was added to discolorize the mixture followed by an excess of ammonium hydroxide. After extraction with chloroform and removal of the chloroform, 7.5 g. of oil was obtained. It was dissolved in 5 volumes of ethanol and treated with ethanolic-hydrogen chloride to give 4 g. of product. Recrystallization of the same from ethanol yielded the desired product, 2-(4-chlorophenyl) - 3 - (3 - n - pentylaminopropyl) - 4-thiazolidone-1-dioxide hydrochloride, melting at 198.5-200° C. (corr.).

B. *2 - phenyl - 3 - (3 - n - butylaminopropyl) - 4 - thiazolidone - 1 - dioxide hydrochloride.*—This preparation was carrid out according to the procedure used in Example III-A, but using as the starting thiazolidone, 2-phenyl-3-(3-n-butylaminopropyl)-4-thiazolidone. The product, 2-phenyl - 3 - (3 - n - butylaminopropyl) - 4-thiazolidone -1-dioxide hydrochloride, melted at 158.8–160.4° after recrystallization from ethanol.

Other 2-aryl-3-(secondary-alkamino)-4-thiazolidone -1-dioxides that are prepared by the above procedure described in Example III-A using the appropriate starting 2-aryl-3-(secondary-alkamino)-4-thiazolidones including the following: 2 - (4 - n - butoxyphenyl) - 3 - (3 - cyclohexylmethylamino - 2 - propyl) - 4 - thiazolidone - 1 - dioxide; 2 - (4 - n - butylaminophenyl) - 3 - (3 - (2 - phenylethylamino)propyl) - 4 - thiazolidone - 1 - dioxide; 2 - (3,4 - methylenedioxyphenyl) - 3 - (3 - isoamylaminopropyl) - 5 - methyl - 4 - thiazolidone - 1 - dioxide; 2 - ( 4-methyl - 1 - naphthyl) - 3 - (3 - cyclopentylaminopropyl)-4-thiazolidone-1-dioxide; and the like.

The compounds of my invention exhibit valuable pharmacological activity, for instance as local anesthetics.

I claim:

1. A compound having the formula

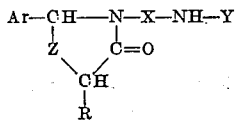

where Ar is an aryl group having 1-2 carbocyclic rings, X is a lower alkylene group having 2-8 carbon atoms, Y is a member of a group consisting of alkyl and hydroxyalkyl groups having 1-8 carbon atoms, cycloalkyl and cycloalkyl-(lower alkyl) groups where the cycloalkyl group has 3-6 ring-carbon atoms and (monocarbocyclic aryl)-(lower alkyl) groups, R is a member of the group consisting of hydrogen and alkyl groups having 1-6 carbon atoms, and Z is a member of a group consisting of S and SO₂; and addition salts thereof.

2. A compound according to claim 1 where Y is a cycloalkyl group having 3-6 ring-carbon atoms.

3. A compound according to claim 1 where Y is an alkyl group having 1-8 carbon atoms.

4. 2 - (3,4 - methylenedioxyphenyl) - 3 - (3-isobutylaminopropyl) - 4 - thiazolidone and acid addition salts thereof.

5. 2 - (3,4 - methylenedioxyphenyl) - 3 - (2-cyclohexylaminoethyl)-4-thiazolidone and acid addition salts thereof.

6. The process of preparing a compound having the formula

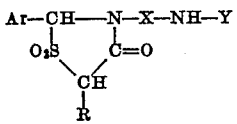

where Ar is an aryl group having 1-2 carbocyclic rings, X is a lower alkylene group having 2-8 carbon atoms, Y is a member of a group consisting of alkyl and hydroxyalkyl groups having 1-8 carbon atoms, cycloalkyl and cycloalkyl-(lower alkyl) groups where the cycloalkyl group has 3-6 ring-carbon atoms and (monocarbocyclic aryl)-(lower alkyl) groups, and R is a member of the group consisting of hydrogen and alkyl groups having 1-6 carbon atoms, which comprises the steps of (a) reacting an anil of the formula ArCH=N—X—NH—Y, where Ar, X and Y have the meanings given hereinabove, with a lower alkyl 2-mercaptoalkanoate to yield a 4-thiazolidone having the formula

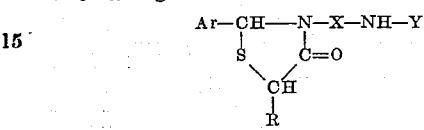

and (b) oxidizing said 4-thiazolidone.

7. The process of preparing a compound having the formula

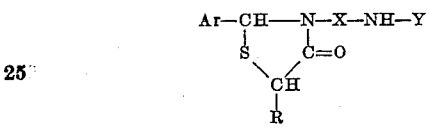

where Ar is an aryl group having 1-2 carbocyclic rings, X is a lower alkylene group having 2-8 carbon atoms, Y is a member of a group consisting of alkyl and hydroxyalkyl groups having 1-8 carbon atoms, cycloalkyl and cycloalkyl-(lower alkyl) groups where the cycloalkyl group has 3-6 ring-carbon atoms and (monocarbocyclic aryl)-(lower alkyl) groups, and R is a member of the group consisting of hydrogen and alkyl groups having 1-6 carbon atoms, which comprises reacting an anil of the formula ArCH=N—X—NH—Y where Ar, X and Y have the meanings given hereinabove, with a lower alkyl 2-mercaptoalkanoate.

8. The process according to claim 7 where Y is a cycloalkyl group having 3-6 ring-carbon atoms.

9. The process according to claim 7 where Y is an alkyl group having 1-8 carbon atoms.

10. The process of preparing a compound having the formula

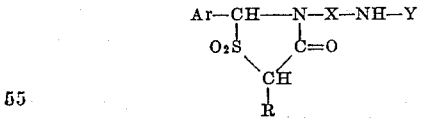

where Ar is an aryl group having 1-2 carbocyclic rings, X is a lower alkylene group having 2-8 carbon atoms, Y is a member of a group consisting of alkyl and hydroxyalkyl groups having 1-8 carbon atoms, cycloalkyl and cycloalkyl-(lower alkyl) groups where the cycloalkyl group has 3-6 ring-carbon atoms and (monocarbocyclic aryl)-(lower alkyl) groups, and R is a member of the group consisting of hydrogen and alkyl groups having 1-6 carbon atoms, which comprises oxidizing a 4-thiazolidone having the formula

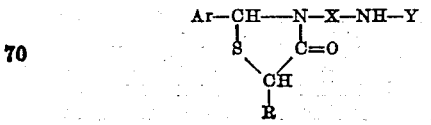

where Ar, X, Y and R have the meanings designated hereinabove.

11. The process of preparing 2-(3,4-methylenedioxyphenyl) - 3-(3 - isobutylaminopropyl-4-thiazolidone which comprises reacting N-(3,4-methylenedioxybenzylidene)-3- (isobutylamino)-propylamine with a lower alkyl thioglycolate.

12. The process of preparing 2-(3,4-methylenedioxyphenyl) - 3 - (2 - cyclohexylaminoethyl)-4-thiazolidone which comprises reacting N-(3,4-methylenedioxybenzylidene) - 2 - (cyclohexylamino)ethylamine with a lower alkyl thioglycolate.

13. 2- (3,4- methylenedioxyphenyl) - 3 - (3-n-amylinopropyl)-4-thiazolidone and acid addition salts thereof.

14. 2-(3,4-methylenedioxyphenyl) -3- (3-cyclohexylaminopropyl) -4-thiazolidone and acid addition salts thereof.

15. 2-(3,4-methylenedioxyphenyl) -3-(3-benzylaminopropyl) -4-thiazolidone and acid addition salts thereof.

16. A compound having the formula

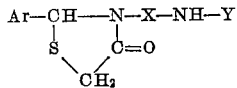

where Ar is a monocarbocyclic aryl group, X is a lower alkylene group having 2–8 carbon atoms and Y is an alkyl group having 1–8 carbon atoms; and acid addition salts thereof.

17. A compound according to claim 16 where Ar is 3,4-methylenedioxyphenyl.

18. A compound having the formula

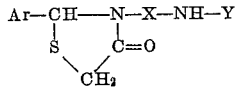

where Ar is a monocarbocyclic aryl group, X is a lower alkylene group having 2–8 carbon atoms and Y is a cycloalkyl group having 3–6 ring-carbon atoms; and acid addition salts thereof.

19. A compound according to claim 18 where Ar is 3,4-methylenedioxyphenyl.

20. A compound having the formula

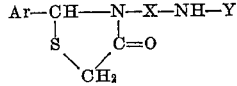

where Ar is a monocarbocyclic aryl group, X is a lower alkylene group having 2–8 carbon atoms and Y is a (monocarbocyclic aryl)-(lower alkyl) group; and acid addition salts thereof.

21. A compound according to claim 20 where Ar is 3,4-methylenedioxyphenyl.

22. The process of preparing 2-(3,4-methylenedioxyphenyl) - 3 - (3 - n-amylaminopropyl)-4-thiazolidone which comprises reacting N-(3,4-methylenedioxybenzylidene) -3- (n-amylamino)-propylamine with a lower alkyl thioglycolate.

23. The process of preparing 2-(3,4-methylenedioxyphenyl) - 3-(3 - cyclohexylaminopropyl)- 4-thiazolidone which comprises reacting N-(3,4-methylenedioxybenzylidene) - 3 - (cyclohexylamino)propylamine with a lower alkyl thioglycolate.

24. The process of preparing 2-(3,4-methylenedioxyphenyl) - 3 - (3-benzylaminopropyl)-4-thiazolidone which comprises reacting N-(3,4-methylenedioxybenzylidene) - 3 - (benzylaminopropylamine with a lower alkyl thioglycolate.

25. The process of preparing a compound having the formula

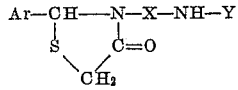

where Ar is a monocarbocyclic aryl group, X is a lower alkylene group having 2–8 carbon atoms and Y is an alkyl group having 1–8 carbon atoms, which comprises reacting an anil of the formula

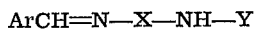

where Ar, X and Y have the meanings already given, with a lower alkyl thioglycolate.

26. The process according to claim 25 where Ar is 3,4-methylenedioxyphenyl.

27. The process of preparing a compound having the formula

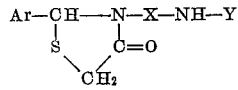

where Ar is a monocarbocyclic aryl group, X is a lower alkylene group having 2–8 carbon atoms and Y is a cycloalkyl group having 3–6 ring-carbon atoms, which comprises reacting an anil of the formula

where Ar, X and Y have the meanings already given, with a lower alkyl thioglycolate.

28. The process according to claim 27 where Ar is 3,4-methylenedioxyphenyl.

29. The process of preparing a compound having the formula

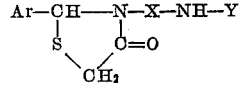

where Ar is a monocarbocyclic aryl group, X is a lower alkylene group having 2–8 carbon atoms and Y is a (monocarbocyclic aryl)-(lower alkyl) group, which comprises reacting an anil of the formula

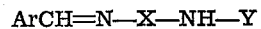

where Ar, X and Y have the meanings already given, with a lower alkyl thioglycolate.

30. The process according to claim 29 where Ar is 3,4-methylenedioxyphenyl.

ALEXANDER R. SURREY.

No references cited.

Certificate of Correction

Patent No. 2,520,179　　　　　　　　　　　　　　　　　　August 29, 1950

ALEXANDER R. SURREY

It is hereby certified that error appears in the printed specification of the above numbered patent requiring correction as follows:

Column 1, line 16, for "Z is or" read *Z is N or*; line 32, for "group" read *groups*; column 2, line 20, after the word "diethoxyphenyl" insert a closing parenthesis; line 35, for the right-hand portion of the compound reading "CH³" read *CH₃*; column 4, line 3, after "benzylidene" insert a closing parenthesis; line 29, for "3,4-" read *(3,4-*; line 52, for "intermeidate" read *intermediate*; column 5, line 17, for "-NH2" read *-NH₂*; same column, Table II, heading to third column thereof, for "P. P. at mm." read *B. P. at mm.*; column 8, line 38, for "separated" read *separator*; column 9, line 55, for "filtrated" read *filtrate*; column 11, line 13, for "carrid" read *carried*; line 24, for "including" read *include*; column 13, line 13, for "amylinopropyl" read *amylaminopropyl*; column 14, line 7, for "(benzylamino-" read *(benzylamino)-*;

and that the said Letters Patent should be read as corrected above, so that the same may conform to the record of the case in the Patent Office.

Signed and sealed this 12th day of December, A. D. 1950.

[SEAL]

THOMAS F. MURPHY,
*Assistant Commissioner of Patents.*